US008073804B1

(12) United States Patent  (10) Patent No.: US 8,073,804 B1
Rubin  (45) Date of Patent: Dec. 6, 2011

(54) SYSTEM AND METHOD FOR TYPE 2 KASER (KNOWLEDGE AMPLIFICATION BY STRUCTURED EXPERT RANDOMIZATION)

(75) Inventor: Stuart Harvey Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 542 days.

(21) Appl. No.: 12/390,633

(22) Filed: Feb. 23, 2009

(51) Int. Cl.
*G06F 17/00* (2006.01)
*G06N 5/02* (2006.01)
(52) U.S. Cl. ........................................................ 706/48
(58) Field of Classification Search ....................... 706/48
See application file for complete search history.

(56) References Cited

U.S. PATENT DOCUMENTS

| 7,047,226 | B2  |   | 5/2006  | Rubin |         |
|-----------|-----|---|---------|-------|---------|
| 7,840,506 | B1  | * | 11/2010 | Rubin | 706/14  |
| 7,840,518 | B1  | * | 11/2010 | Rubin | 706/47  |
| 7,899,674 | B1  | * | 3/2011  | Rubin | 704/270.1 |
| 7,925,496 | B1  | * | 4/2011  | Rubin | 704/7   |

OTHER PUBLICATIONS

Fuzzy systolic arrays, Manzoul, M.A.; Serrate, H.A.; Multiple-Valued Logic, 1988., Proceedings of the Eighteenth International Symposium on Digital Object Identifier: 10.1109/ISMVL.1988.5160 Publication Year: 1988 , pp 106-112.*
Fuzzy modeling based on premise optimization, Xiong, N.; Litz, L.; Fuzzy Systems, 2000. FUZZ IEEE 2000. The Ninth IEEE International Conference on vol. 2 Digital Object Identifier: 10.1109/FUZZY.2000.839144 Publication Year: 2000 , pp. 859-864 vol. 2.*
Rotary Cement Kiln Control for Reducing NOx Emissions to Atmosphere, Batzias, F.A.; Emerging Technologies and Factory Automation, 2006. ETFA '06. IEEE Conference on Digital Object Identifier: 10.1109/ETFA.2006.355361 Publication Year: 2006 , pp. 879-886.*
Modeling for military system by weighted complex networks, Wen, Rui; Chen, Xiao-qing; Dong, Zheng-bao; Meng, Fan-liang; Li, Guo-yi; Control and Automation (ICCA), 2010 8th IEEE International Conference on Digital Object Identifier: 10.1109/ICCA.2010.5524233 Publication Year: 2010 , pp. 115-118.*
U.S. Appl. No. 11/854,638, Rubin.
Escardo, M., "Complexity considerations for hash tables", Jan. 12, 2006, online: "http://www.cs.bham.ac.uk/~mhe/foundations2/node92.html" taken Dec. 15, 2008.

(Continued)

*Primary Examiner* — Michael B Holmes
(74) *Attorney, Agent, or Firm* — Kyle Eppele; J. Eric Anderson

(57) ABSTRACT

A KASER (Knowledge Amplification by Structured Expert Randomization) engine reaches conclusions in a semantic format or which take the form of a series of rules. The conclusions are parsed into an array structure having a hierarchical order of validity. A set of inserted rules is received as an initial rules array and are configured so that an antecedent comprises a non-empty, sorted set and a consequent comprises a non-empty sequence. A hierarchy of validity for the rules is determined and the rules are sorted according to the hierarchy. At least one rule set which optimizes the selection of rules is determined, with the rule set meeting predetermined validity requirements, and the rules are ordered in an order of validity, such as an order based on a maximal length antecedent set as a highest rank.

17 Claims, 6 Drawing Sheets

OTHER PUBLICATIONS

Rubin, S., et al., "Learning Using an Information Fusion Approach", Proc. of the ISCA Int'l Conference on Intelligent and Adaptive Systems, Nice, 2004.

Chaitin, G.J., "Randomness and Mathematical Proof", Sci. Amer., vol. 232, No. 5, pp. 47-52, 1975.

Zadeh, L.A., "From Computing with Numbers to Computing with Words . . . ," IEEE Trans. Ckt. and Systems, vol. 46, No. 1, pp. 105-119, 1999.

Rubin, S.H., et al., "On the Role of Informed Search in Veristic Computing", Proc. 2001 IEEE Int. Conf. Syst., Man, Cybern., pp. 2301-2308, 2001.

Rubin, S.H., et al., "KASER: Knowledge Amplification by Structured Expert Randomization", IEEE Trans. Syst., Man, Cybern.: Part B, vol. 34, No. 6m Dec. 2004, pp. 2317-2329.

Rubin, S.H., "On randomization and discovery", Information Sciences, vol. 177, pp. 170-191, Jan. 2007.

* cited by examiner

SYSTEM AND METHOD FOR TYPE 2 KASER (KNOWLEDGE AMPLIFICATION BY STRUCTURED EXPERT RANDOMIZATION)

FEDERALLY-SPONSORED RESEARCH AND DEVELOPMENT

This invention (Navy Case No. 099503) was developed with funds from the United States Department of the Navy. Licensing inquiries may be directed to Office of Research and Technical Applications, Space and Naval Warfare Systems Center, San Diego, Code 2112, San Diego, Calif., 92152; telephone (619)553-2778; email: T2@spawar.navy.mil.

REFERENCE TO A COMPUTER PROGRAM LISTING APPENDIX

Appended to this application is a text file titled "099503_cpl.txt" (37085 bytes), which contains a Computer Program Listing Appendix that shows a flowcode of a Type 2 KASER System, which is incorporated by reference herein in its entirety.

BACKGROUND

1. Field

This disclosure relates to an expert system for deriving possibilities and conclusions, in which a hierarchical structure is used for deriving proposed conclusions.

2. Background

First-generation expert systems are known in the data base processing arts as production systems where the knowledge base and inference engine are disjointed. Second-generation expert systems are improved in the art to include a rudimentary learning capability, which may be implemented by the interpretation of grids or by user query. Third-generation expert systems are further improved to provide for rule base learning through the use of deductive and inductive processes.

Conventional analysis of information includes manually combing through vast databases and unstructured text/reports. An alternative method would be to use a database computer language such as structured query language (SQL) to perform directed mining operations. This approach is not fully general, is difficult and costly to maintain, and does not provide a capability for linking database events. Moreover, such database mining is less than optimal at rendering conclusions and probabilities.

Rendering conclusions can require association of ostensively random events or events which appear to be random. An example of event-related activity for detection would be detection based on a previously acquired signature of the activity.

Conventional expert systems require that all knowledge be hand-tailored and manually checked for validity and consistency. In particular, conventional alternatives are either not creative, or do not reason using symbolic knowledge; i.e., computing with words.

Conventional analysis of information includes manually combing through vast databases and unstructured text/reports. For purposes of data analysis, a given concept may be broadly defined, or defined within a particular context. This may or may not have a direct correspondence to a general definition of the concept, but relates to a specific aspect of the concept. Therefore, substantial human analogical reasoning was required.

U.S. Pat. No. 7,047,226, to Rubin, titled "System and Method for Knowledge Amplification Employing Structured Expert Randomization" describes a Type 1 Knowledge Amplification Employing Structured Expert Randomization (KASER) engine, and describes the general concept of a Type 2 KASER engine. The Type 1 KASER is described as allowing the user to supply declarative knowledge in the form of a semantic tree using single inheritance. In a Type 1 KASER, words and phrases are entered into the system by an operator by means of, for example, pull-down menus. In this manner, semantically identical concepts (e.g., Hello and Hi) may be entered with equivalent syntax by the operator to avoid diluting the learning efficiency of the KASER.

Accordingly, there remains in the art a clearly-felt need for an expert system architecture that may automatically expand the rule base without the concomitant data input burden associated with error correction needed to optimize expert system performance. An expert system that includes learning means for acquiring a rule system that functions as a larger virtual rule system with reduced error probability has, until now, been unavailable in the art. These unresolved problems and deficiencies are clearly felt in the art and are solved by the present subject matter in the manner described below.

SUMMARY

Conclusions in a semantic format or which take the form of a series of rules, are parsed into an array structure having a hierarchical order of validity. A set of inserted rules is received as an initial rules array. The rules are configured so that an antecedent comprises a non-empty, sorted set and a consequent comprises a non-empty sequence. A hierarchy of validity for the rules is determined and the rules are sorted according to the hierarchy. At least one rule set which optimizes the selection of rules is determined, with the rule set meeting predetermined validity requirements, and the rules are ordered in an order of validity, such as an order based on a maximal length antecedent set as a highest rank.

DETAILED DESCRIPTION

Figure 1:
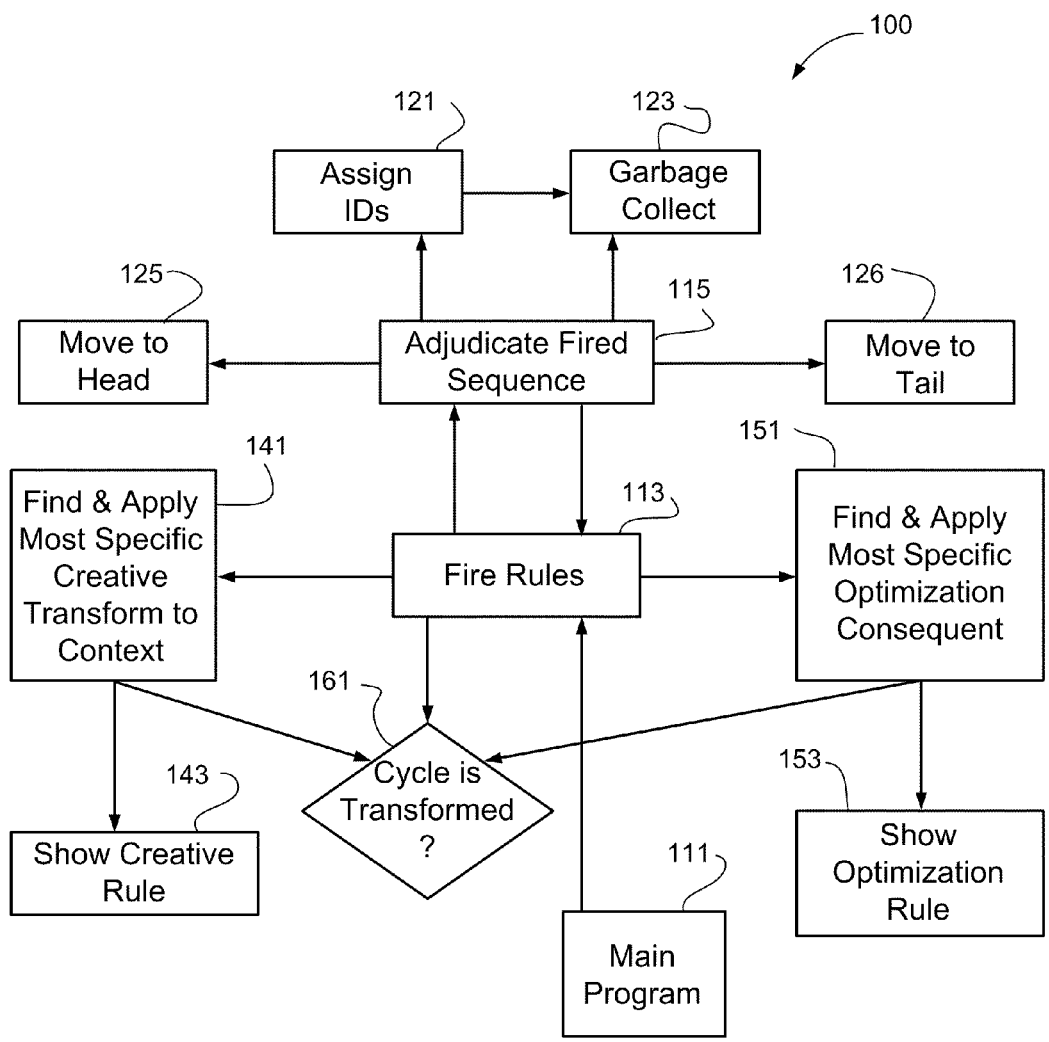
FIG. 1 is a schematic block diagram depicting a Type 2 KASER System process.

The relative validity of all non-trivial knowledge (i.e., knowledge capable of self-reference) is relative and varies with domain and time. In the Type 2 KASER system, described herein, transformation may be used to induce symmetric rules. Transforms serve to creatively transform and thus dynamically normalize contexts and rule antecedents, which in turn facilitates the transformative induction of new knowledge. Creative transformations are created by pairing rule antecedents having a common consequent such that the direction of transformation is always towards the more likely to be valid. Likewise, transforms can also serve to creatively optimize and thus dynamically normalize contexts and rule consequents. Creative optimizations may be created by pairing non-deterministic rule consequents having a common antecedent such that the direction of optimization is always toward the more likely to be valid.

This methodology respects the fact that in any non trivial system, erroneous rules (and their implied transforms/optimizations) can best be discovered, corrected, or purged through the exercise of the knowledge. Furthermore, coherent processor clusters can be networked to create a System of Systems. Here, each cluster can pump the knowledge in each other to induce intra and extra domain knowledge amplification, which accounts for so-called common sense knowledge as well as creativity. Such a System of Systems effectively implements Minsky's Society of Mind. Correctness statistics, if maintained, can be expected to show that the error rate for transformative knowledge decreases over time as a function of scale and domain cohesion. Taken in combination, an effective intelligence is realizable.

The following is a written example of a creative transformation:
Rule 1: {airplane, explosives, terrorists}→(al-Qa'-ida used TNT to bring down a commercial airliner)
Rule 2: {airplane, bombs, terrorists}→(al-Qa'-ida used TNT to bring down a commercial airliner).
The fact that both rules 1 and 2 have the same consequent, leads to the following:
{airplane, explosives, terrorists}←→{airplane, bombs, terrorists}.
Note that one cannot necessarily generalize to: {explosives}←→{bombs} because of the loss of set context, which here includes airplane and terrorists. Suppose that the following production rule is used:
{airplane, explosives, lighters, terrorists}→(Issue a Red Alert).
Then, it follows from the rules above that it is possible to correctly induce the production rule: {airplane, bombs, lighters, terrorists}→(Issue a Red Alert). Were this deemed to be incorrect, the user would be queried to find the correct consequent and supply it as a new phrase association. It is noted that an advantage of this methodology is that it can be used to induce context-sensitive knowledge.

The most-specific rules will be first to be fired and within this strata the most possible rules are preferred. The firing of the rule is the initialization and implementation of the rule. Thus, if there is a large number of rules, only some rules are applied to a particular input, and those rules (or rule) are considered to be fired. For example, if one wanted to resolve a problem involving a bicycle based on vehicle rules, one would be more likely to "fire" rules related to motion and acceleration and less likely to fire rules related to ignition and exhaust. On the other hand, a rule related to fuel use may or may not be relevant to the operation of a bicycle, which also requires energy.

Parallel and Distributed Processing: The two processing paradigms are Single Instruction, Multiple Data (SIMD) and Multiple Instruction stream, Multiple Data stream (MIMD). The SIMD approach deploys one copy of the code on each system, where the problem domain is partitioned and each processor is given responsibility for one partition of the problem space. In the MIMD approach, the same executable is run on multiple nodes. Here, one copy of the executable code deploys across multiple systems that are networked and/or utilize multiple CPUs within the same system. There is less probability of error using a MIMD architecture because you don't have to handle mutual exclusion (mutex) inherent serial code. It is also easier to convert serial code to MIMD code and extend the number of nodes in the future.

Type 2 KASER (T2K) Process

FIG. 1 is a schematic block diagram depicting a Type 2 KASER System process 100. A main program (indicated at step 111) provides a request to fire rules (step 113). The fire rules procedure (step 113) in turn causes adjudication of fired rule sequence (step 115).

The adjudication of fired rule sequence (step 115) effects assignment of IDs to an array (step 121) and garbage collection (step 123), with garbage collection step 123 incorporating the assignment of IDs. Garbage collection (step 123), as used in the standard computer sense, provides that when something is discarded, the space it occupied needs to be coalesced for reuse. The garbage collection (step 123) is configured for efficient reuse of memory space. Adjudication of fired rule sequence (step 115) also effects a move to head (step 125) and a move to tail (step 126).

Adjudication of fired rule sequence (step 115) is used to provide fire rules (step 113) and fire rules (step 113) provide information for adjudication of fired rule sequence (step 115) to perform adjudication. If one rule is present in a sequence, the result is immediate. If many rules are present, statistical mechanics are used, whereby an adjudicated erroneous sequence sends all participants to the logical tail of the list and conversely, correct ones are moved to the logical head of the list. This "bubbles" the best rules to the head and the worst to the tail where they will be reused or expunged, respectively. Note that correct or incorrect rules are readily identified and moved to the head or deleted, respectively, when the fired sequence is a singleton. Fire rules (step 113) results in finding and applying a most specific creative transform to context (step 141), which in turn shows a creative rule (step 143). Fire rules (step 113) also result in finding and applying a most specific optimization to consequent (step 151), which in turn shows an optimization rule (step 153). The applying the optimization to the consequent (step 151) is accomplished by detecting cycles using hashing. The cycles are then excluded from the process. The finding and applying a most specific creative transform to context (step 141) results in a determination of whether the cycle results in a transformation (step 161). Similarly, applying the optimization to the consequent (step 151) results in a determination of whether to exclude a process, and therefore whether a cycle would occur in the transformation (step 161). Upon a positive determination that the cycle is transformed (at step 161), detected cycles are broken by deleting the last state prior to the cycle, in which case the desired acyclic transformation path remains. In the case of a negative determination of a cycle transformation (determination step 161), other rules will be selected at random in a worst case. Alternatively, an acyclic transformation path will be found. The Type 2 KASER flow code may be found in the Computer Program Listing Appendix.

Type 2 KASER (T2K) Algorithm

1. Rules are maintained in an array structure. The array structure is faster than a doubly-linked list and can be maximally dimensioned for a processor cluster. No rule can ever be said to be 0 or 100 percent valid. As is the case with software validation in general, the degree of rule-base validation bears proportion to the exercise of its constituent rules in the solution of multiple problems. The rules less likely to be valid, i.e., those having lesser possibilities, will either be expunged or moved to the bottom of the array, where they are more likely to be expunged, or serve as the pre-image of any transformative process; whereas, the more likely to be valid rules, i.e., those having greater possibilities, will be moved to the head of the array, where they are more likely to be fired as well as serve as the image of any transformative process. Rule movement insures that the induced transforms will lead to the firing of the rules most likely to be valid; i.e., those having the greatest possibilities. The rules array is periodically backed up to secondary storage to serve in case of failure, or for use in performing a cold start.

2. Rules created by the user are inserted at the head of this array as described below. They may be new rules or may indirectly specify an antecedent or consequent correction as discussed below. In this manner, truth maintenance is implemented. Whenever an acquired rule is a duplicate, the lower duplicate is expunged. At most, one such duplicate is possible per processor cluster.

3. Let rules be of the form, $\{i, j, k, \ldots\} \rightarrow (u\ v\ w)$, where the antecedent consists of a non-empty, sorted set of distinct positive integers and the consequent consists of a non-empty sequence of positive integers—including the normalized insertion (INS) and erasure (ERA) commands and their arguments. The context has the same format as the antecedent. Positive integers are translated to and from their textual menu equivalents through the use of hash tables.

4. Let, Ri and Rj be two distinct rules, where Rj is the more valid of the two; i.e., on top, such that the antecedent of Ri, denoted RiA, is such that RiA<>RjA (or the rules would not be distinct) and the consequent of Ri, denoted RiC, is such that RiC=RjC. Then, it is possible to induce a creative transformation rule, Tk: RiA→RjA. For example, R1: $\{1, 2\} \rightarrow (4\ 3\ 4)$ and R2: $\{1, 3, 5\} \rightarrow (4\ 3\ 4)$ induces the creative transformation rule, T1: $\{1, 2\} \rightarrow \{1, 3, 5\}$. Creative transformation rules may not be right recursive. For example, the right-recursive transformation rules, $\{1\} \rightarrow \{1\}$, $\{1\} \rightarrow \{1, 2\}$, or $\{2, 3\} \rightarrow \{1, 2, 3\}$ may not be applied because the set on the left is embedded in the set on the right. Moreover, the creative transformation rule, $\{1, 3\} \rightarrow \{1, 2, 3\}$ may not be applied because it is also a right recursive set. This is easy to check for prior to the generation of a creative transformation rule. Sequentially normalized insert (INS) and erase (ERA) commands, if any, along with their monadic arguments, must be the same (and in the same sorted order) in each of a pair of consequents if they are to be properly equated.

5. Let, Ri and Rj be two distinct rules, where Rj is the more valid of the two; i.e., on top, such that RiA=RjA and RiC<>RjC (or the rules would not be distinct). It is noted that this defines a non-deterministic rule pair. Then, it is possible to induce an optimization rule. This provides: RiC→RjC. For example, R1: $\{1, 2\} \rightarrow (4\ 3\ 4)$ and R2: $\{1, 2\} \rightarrow (3\ 4\ 5)$ induces the optimization rule, O1: $(4\ 3\ 4) \rightarrow (3\ 4\ 5)$. The optimization rules are independent of the hierarchy rules. Optimization rules may not be right recursive. For example, the right-recursive optimization rules, $(1) \rightarrow (1)$, $(1) \rightarrow (1\ 2)$, or $(2\ 3) \rightarrow (1\ 2\ 3)$ may not be applied because the sequence on the left is embedded in the sequence on the right. However, the optimization rule, $(1\ 3) \rightarrow (1\ 2\ 3)$ may be applied because it is not a right recursive sequence. This is easy to check for prior to the generation of an optimization rule.

6. Sets need to be maintained in sorted order, for the pattern matcher, after each creative transformation. Clearly, optimized consequent sequences are not sorted, although their sequence of INS and ERA commands with arguments must be re-normalized after each optimization, which alters the sequence of these commands in any way to facilitate the pattern matcher in a graphical user interface (GUI) such as that disclosed in U.S. patent application Ser. No. UNKNOWN, filed DATE EVEN, titled "Graphic User Interface having Menus for Display of Context and Syntax Useful in an Artificial Intelligence System" by S. H. Rubin, which is incorporated by reference herein in its entirety. For example, if a rule antecedent was $\{1, 2, 3\}$ and a transformation rule was $\{1, 3\} \rightarrow \{2, 4, 5\}$; then, the sorted transformed antecedent would be, $\{2, 4, 5\}$, since duplication of set elements is never allowed. It is noted that this process does not readily lend itself to the efficient use of hashing due to the dynamic combinatorics of pattern matching.

7. There are $$\binom{n}{r} = \frac{n}{r!(n-r)!}$$

antecedent subsets of length r in a context of length n. If all rules in the base had approximately the same validity or possibility, then each of these subsets, from longest (most-specific) to shortest (most-general) would be hashed, providing an associative memory, to see if the context can fire a rule in the base. There are $2^n-1$ subsets of the context. Subsets can be generated by counting through the binary numbers, where a one designates predicate inclusion and a zero non-inclusion.

In this circumstance, the array needs to be searched in order for the first most valid and most-specific rule, i.e., the one having a maximal length antecedent set, that is covered by the current creatively transformed contextual set. This is not efficiently accomplished using hashing due to the requirement for returning the first most-specific matched rule in the rules array (and that the rules are constantly being subjected to movement and deletion). It is however efficiently achievable using custom associative hardware if the maximal size of the context and the rules array are necessarily limited, which may indeed be the situation in the case of the human brain.

8. At this point, it may be argued that more-specific rules have less chance of contextual error. This offsets any reason to fire higher, more-general, and relatively more possible rules in lieu of lower, more-specific, and less possible ones. Then, among the equally most-specific candidate rules, the "highest", i.e., relatively most-possible, one will be the one to be fired. The first time an antecedent set is encountered, the rules row number and the length of its antecedent are saved as an ordered pair of memory cells. Every time a longer covered antecedent set is encountered using a top-down linear search, the rules row number and the length of its antecedent are saved as an ordered pair of memory cells. This applies up to and including the length of the contextual set, which immediately and successfully terminates the search. This first-found highest and longest covered antecedent then associates with the most valid (possible), most-specific rule to be fired, if any.

9. It is desired to minimize the number of general creative transformations of the context so as to minimize the introduction of combinatoric error. Such error is minimized as follows. The search is initialized to report an unsuccessful match as discussed below. The rule base is first combed by the initial untransformed context for a most-specific matching rule. If successful, the current context and the topmost row number of the most-specific rule are saved. Next, a most-specific creative transform of the context is made, if any. The search for a most-specific matching rule is repeated, starting with the sorted result of each subsequent creative transformation of the context. The current transformed context and the topmost row number of the most-specific rule overwrite the previously saved pair just in case the matched rule is more specific, or the new row number is closer to the head of the array than the previously saved one for the same degree of specificity. This process terminates upon not being able to further creatively transform the context, hitting a cycle in the transformed context as discussed below, or upon receiving an interrupt to transmit the best result available at the time. In all cases, a most-specific rule, if any, that is closest to the head of the array is returned to be fired. The linear search for a first most-specific rule can be parallelized over several processors, if so designed. Here, each acyclic creative transformation of the context allows for a staggered parallel search for a best match as was just defined.

10. The creative transformational process is applied to every new context, i.e., subsequent to being sorted by the GUI, or sorted context after being modified by some rule action. These are defined to be non-monotonic rules. Again, the context is sorted after being transformed by any creative transformation rule. These updates are performed prior to attempting to match and fire the topmost most-specific rule antecedent. Identifiers are used to indicate which rule antecedents or consequents are an exact match of which others to enable the formation of optimization or creative transformation rules, respectively. Thus, for example, all rules having a consequent identifier of seven will have the exact same consequent for use in forming creative transformations. Likewise, all rules having a antecedent identifier of seven will have the exact same antecedent for use in forming creative optimizations.

Whenever a new rule is acquired, it is given the same consequent identifier as the first exactly matching consequent in the rules array, if any, searched top-down. If no matching consequent is found, then it is assigned the next incremental ID. Antecedent and consequent IDs represent distinct orderings and thus can use the same integers. Expunged rules have their IDs stacked for reuse just in case subsequent to that rule deletion, that ID is no longer in use. The stack must be empty prior to generating a new ID.

An unmatched context will be literally acquired; i.e., not creatively transformed. Note that rule antecedents are not to be (re) transformed once acquired because to do so might introduce error into their existing mutually transformative interaction. Rather, additional rules are to be acquired in such cases as discussed below. Here, the rule antecedents are checked from the bottom of the rules array to the top to find the lowest (least likely to be valid) most-specific (longest) subset (which includes the original set), if any, of the latest version of the context, which has the same consequent ID above it; i.e., searched for from the top of the array down. Global creative transformation would require exhaustive search of all possible subsets of applied most-specific creative transformation rules, which is potentially intractable; rather, a heuristic corner point approach is used as follows.

This higher topmost antecedent, having the same consequent ID, replaces the previously matched subset in the context to form a heuristic creative transformation, which must be locally and globally acyclic as discussed below. The process is iterated until no longest subset can be so replaced, or a cycle is detected, the last offending creative transformation skipped, and otherwise run to conclusion. This process will insure that the creatively transformed context matches and fires a most-valid (highest possibility) rule. The number of rules required in the array for a given functionality is thus minimized through the use of knowledge transformation.

11. Whenever a new rule is acquired, it is given the same antecedent identifier as the first exactly matching antecedent in the rules array, if any, searched top-down. If no matching antecedent is found, then it is assigned the next incremental ID. Expunged rules have their IDs stacked for reuse just in case subsequent to that rule deletion, that ID is no longer in use. The stack must be empty prior to generating a new ID.

Whenever a rule is acquired, it will have its consequent literally acquired. Note that rule consequents are not to be (re) optimized once acquired because to do so might introduce error into their existing mutually transformative interaction. Rather, additional rules are to be acquired in such cases as discussed below. Here, the rule consequents are checked from the bottom of the rules array to the top to find the lowest (least likely to be valid) most-specific (longest) sequence, if any, which is embedded by the latest version of the consequent to be optimized and having the same antecedent ID above it; i.e., searched for from the top of the array down. Global optimization would require exhaustive search of all possible subsequences of applied most-specific optimization rules, which is potentially intractable. Rather, a heuristic corner point approach is used as follows.)

This higher topmost consequent, having the same antecedent ID, replaces the previously matched embedded sequence in the consequent to form a heuristic optimization, which must be locally and globally acyclic. The process is iterated until no longest embedding can be so replaced, or a cycle is detected, the last offending optimization skipped, and otherwise run to conclusion. The validity or possibility of a dynamic transformative knowledge space is thus maximized.

12. A combination of the following can potentially fire an infinite sequential cycle:

(rules) (creative transformations) (optimizations)

Therefore, during creative transformation and again subsequently under the modifying actions of ERA and INS non monotonic commands, the new consequent to be acquired, is saved in distinct temporary hash tables until it is found, if ever, that the consequent state has been previously saved in a sequence consisting of more than one consequent state. In other words, such repetition can be most conveniently detected by temporarily hashing the most-recent state vector until it is found, if ever, that it has been previously saved in a sequence consisting of more than one state.

Creative transformation of the context stops if no further creative transformations can be made, or upon interrupt. There are no rule deletions in this case because, in theory, as exemplified by the Unsolvability of the Randomization Problem, perfection in creative transformation or optimization is not provably attainable in the general non-trivial case. If right recursion or a global cycle is detected in a candidate creative transformation and/or optimization rule, then a relatively less-valid right-hand side is sought such that it remains relatively more valid than the left-hand side. Similarly, if a cycle is detected and not resolved by searching for a relatively less-valid right-hand side, then another bottommost most-specific left-hand side is iteratively sought. It is noted that the most-specific transforms, which are statistically least likely to induce a cycle by definition, will have completed first for a maximal proper transformative effect.

The firing sequence is defined to be incorrect in the presence of a non-monotonic contextual cycle, or is run to completion, i.e., until no rule in the rules array can be fired, for subsequent adjudication as to the correctness of the produced consequent, if any. The validity or possibility of the rules array is maximized by iteratively deleting the last rule to participate in an erroneous cycle. This is also more directed than periodically expunging part of the array tail, which serves to supplement the methodology. It is especially important to favor immediate deletion over tail deletion when pumping networked processor clusters so as to maximize coherency by minimizing deletion in the processor clusters.

13. A single rule or a sequence of rules may fire on a given initial context. Each rule has an associated marker bit. These bits are set whenever the associated rule is fired and are reset by default, or upon the conclusion of a firing sequence.

14. Upon the conclusion of a firing sequence, the trusted user may deem the response to be correct, incorrect (and specify a correction), or un-decidable. Failure to match and thus fire at least one rule will cause issuance of the system message, "The system is unable to solve this problem at this time."

15. Creative transformation and optimization rules alike are derived from the rules array and its associated data structure. Thus, memory reclamation never deals with more than a single array here, although the GUI may implement an additional independent scheme.

Here, the array is prevented from "overflowing" by garbage collecting rules that are marked for deletion whenever new rules are to be acquired, or existing rules are to be moved to the head or tail within. Extra rules are expunged from the tail, as necessary, to make room. Such tail deletion can also free room at the array head by subsequently shifting all of the rows down, as appropriate.

While it is no doubt more efficient (and more complex) to accomplish this using a doubly-linked list structure on a PC, arrays—even arrays having a virtually impossible 50 percent of its rows labeled for deletion in the large—provide for more efficient search through the numerous iterations required to transform, match, and select the highest, most-specific rule(s) to fire. They are more efficient for all processes that do not hinge on human intervention because they more than halve the number of array references which would otherwise be required. That is, it is possible to accept the slowdown where the human is in the loop to gain the speedup where the human is out of the loop. Furthermore, the use of fine-grained domain-specific processor clusters in a network architecture insures that no one rule base, i.e., array, will be permitted to grow to such size so as to outstrip its associated (multi-) processor power. Finally, parallel shift registers can be designed in hardware to accomplish the array movement in scalar constant time.

16. If the user deems the firing sequence to have been correct, then the marked rule(s) are moved to the head of the rules array—preserving their relative ordering; i.e., the topmost marked rule becomes the head rule. Here, the relative validity or possibility of each involved rule has statistically increased. Furthermore, a large movement to the head will never alter relative rule validities (possibilities) because their relative ordering has been preserved; i.e., a stable movement. Moreover, such movement among a base consisting of n rules allows for up to n! rule permutations, which implies the same limit on the number of possible creative transformations or optimizations—an astronomical number. There is an upper bound of n! possible acyclic transformations for an arbitrary preimage; i.e., context or consequent.

17. If the user deems the firing sequence to have been incorrect and optionally specifies a correction, then the bottommost fired rule is expunged. The expunging of the rule results in eliminating a sequence consisting of a single erroneous rule, or the one most-likely to be the culprit, and thereby results in annealing the system. When the bottommost fired rule is expunged, its memory is reclaimed, and the remaining marked rule(s), if any, are moved to the tail of the rules array—preserving their relative ordering; i.e., the bottommost marked rule becomes the tail rule. Here, the relative validity or possibility of each involved rule has statistically decreased and the chance for being garbage collected has thus increased as well. Furthermore, a large movement to the tail will never alter relative rule validities (possibilities) because their relative ordering has been preserved; i.e., a stable movement. Erroneous rules will tend to surface subsequently through their use in attempting to solve other problems. This results in eventually expunging the rules, vindicating this methodology.

18. If the user deems the firing sequence to have been incorrect, then the context is restored to its original state prior to being transformed. Rerunning this context again may produce a different result due to rule deletion and/or movement. This process may be repeated to the user's satisfaction. Then, the user may opt to supply a correct consequent for the original context, or the program will automatically supply the correctly produced consequent again (a lower duplicate will be expunged) in order that it will be re-produced more rapidly if the same context were re-presented. The supplied consequent is paired with the original context to make a new rule, which is acquired as previously described—resulting in truth maintenance. Note that the use of creative transforms, optimization, and rule movement imply that just as is the case with human learning, the same correction may on occasion need to be supplied more than once for effective learning to occur.

19. If the user deems the firing sequence to be un-decidable, then no rule will be affected—except to have its marker bit reset through iterative procedure calls. Then, if a correction is specified, as previously described, the resultant rule will be inserted at the head of the rules array. It would be improper to delay feedback, e.g., awaiting the results of (for example) an entire chess game to learn something, This is because to do so would not allow the system to learn from causality. The learning would be only from effect, which by definition is a much weaker form of learning. That is, many problem situations are to be preferred to few, given the same task. Similarly, in expert systems, many fine-grained rules are to be preferred to few coarse-grained ones. This is a fundamental principle of information reuse.

20. The possibility that a fired sequence of rules is correct is simple to compute as a function of each fired rules' relative validity.

Let, m, denote the number of rules in the processor cluster.

Let, n, denote the number of distinct rules in the fired sequence.

Let, $r_i$ denote the relative position, or row number from the top for the ith fired rule in the sequence of length n, where, $1 \leq r_i \leq m$.

Then, $$\text{possibility} = \left[ \min_{i=1}^{n} \left( \frac{m - r_i + 1}{m} \right) \right]$$

expressed as a percent, where a result of 1.0 or 100 percent is to be displayed as 99 percent to better reflect the inherent potential for error. Similarly, the "ceil" of a result near 0 percent will be automatically displayed as 1 percent to better reflect the inherent potential for a correct chance result. Here, the parenthesized ratio gives the possibility for each fired rule taken individually in the sequence.

All creative transformations and optimizations are correctness preserving (enhancing taken in sequence) and otherwise serve to maximize the possibility of a fired rule or sequence of rules by transforming the context so that it is more likely to cover relatively more valid rules and by similarly transforming the consequent so that it too is more likely to be valid. Thus, these transforms are not themselves ascribed possibilities—they only indirectly contribute to the computation of the possibility for a fired sequence of rules.

It can be observed that the system will tend to match and thus fire the most valid rules; i.e., specificity being held constant. The possibility here is thus maximized in so doing.

21. Members of the rules array can be used to create metaphorical explanations. The user may inspect the original and transformed contexts, if applicable, the sequence of fired rules, if any, and the system message, "The system is unable to solve this problem at this time," or by default the fired consequent produced by the last rule in sequence (all translated into English using the GUI reverse hash function). Backtracking is limited to the search for a local rule because fired rules can produce non-monotonic transformations of the context, which would prove to be globally intractable. Backtracking here refers to a local search space.

Creative transformation rules can also be used to create metaphorical explanations. The user may additionally inspect the sequence of creative transformations, if any, translated into English using the GUI reverse hash function, as applied to the context. An attempt is made to fire a most-specific most-valid rule subsequent to each creative transformation of the context. Backtracking is limited to the search for a local creative transformation rule.

Optimization rules can similarly be used to create metaphorical explanations. Here, the user may inspect the sequence of optimizations, if any, translated into English using the GUI reverse hash function, as applied to the fired rule consequents. An attempt is made to optimize a consequent to completion before transferring control. Backtracking is limited to the search for a local optimization rule.

22. The human brain is known to consist of many domain-specific knowledge-processing areas (e.g., Area 17 of the visual cortex, Broca's Area for language processing and speech, Wernicke's Area for language comprehension, the frontal lobes for creativity, and so on). Furthermore, Minsky has described the brain as a Society of Mind—similar to a communicating collection of expert systems. Such a System of Systems may be described as follows.

Processor clusters may be networked, where each cluster handles coherent i.e., domain-specific, knowledge. By way of example, cluster one might handle solar energy, cluster two, energy from fuel cells, and so on. Clusters serve to maximize search efficiency—attributable to the concentration of related knowledge, which allows for knowledge amplification because each processor's constituent rules are maximally coherent; i.e., sharing a maximal number of common antecedents and consequents.

A recursively-defined central node acts as a server for communicating with its satellite nodes. In turn, each satellite node may have the same configuration, which may recur. It follows from information theory that the number of levels of recursion should equal the number of satellite nodes for optimal performance.

Figure 2:
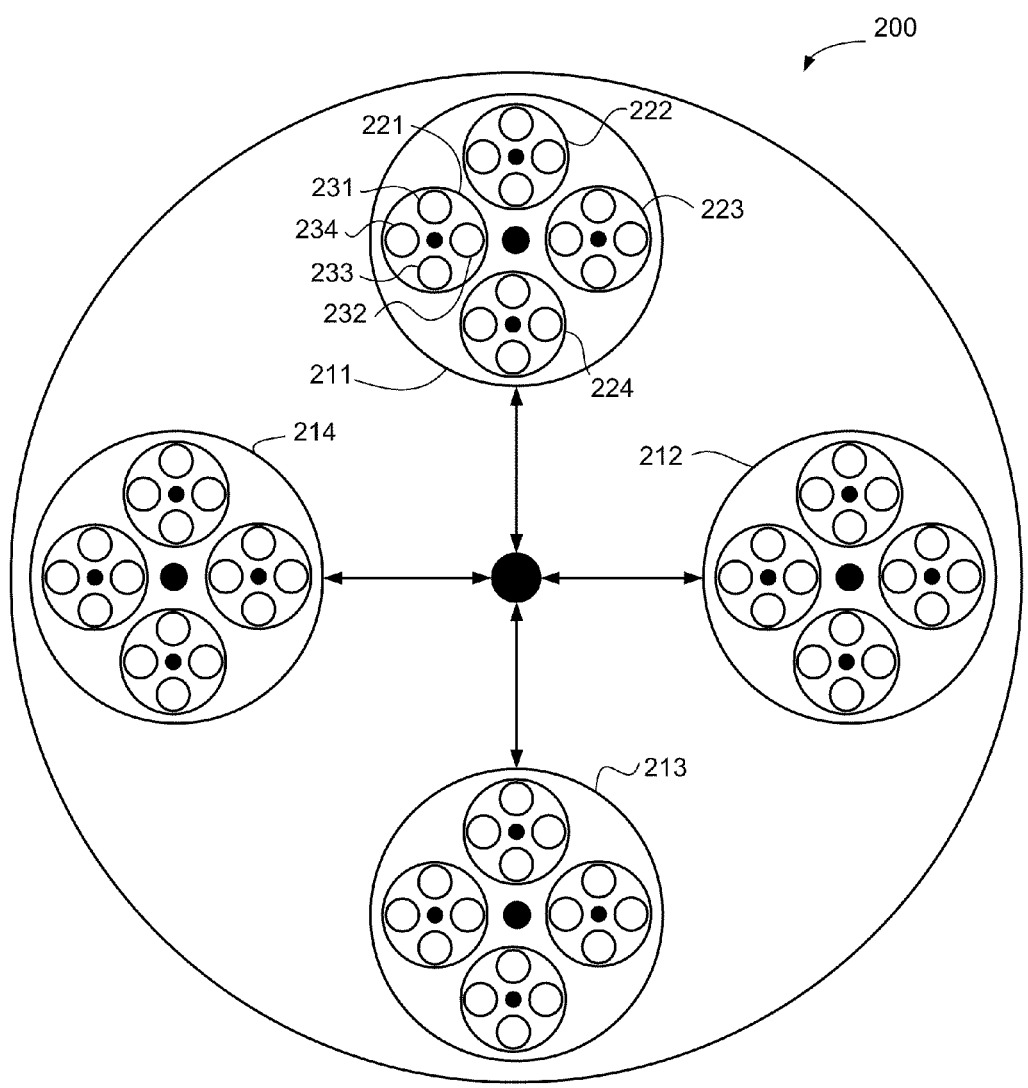
FIG. 2 is a depiction of a Type 2 KASER system in the form of a fractal representation.

FIG. 2 is a diagram of a Type 2 KASER system 200. The depiction takes the form of a fractal representation. Depicted in the diagram is a plurality of nodes 211, 212, 213, 214. Each node 211-214 evolves to be domain specific. The number of nodes is subject to symmetric expansion; i.e., within an approximation of this constraint. Here, each satellite node iteratively and recursively evolves to become a domain-specific problem solver. That is, the notion of domain specific may be subdivided into sub-specialties; however, the transformative interaction among nodes makes it difficult to categorize specialized knowledge within nodes though it exists just the same. This may be akin to the difficulty in recognizing a playing card from the FFT or holographic plate of its image.

In the diagram, the four levels of recursion are represented, in that nodes 211-214 are recursive of the system 200, each of nodes 211-214, for example node 211, recourses to multiple nodes 221, 222, 223, 224. Each of nodes 221-224, for example node 221, recourses to nodes 231, 232, 233, 234.

Creativity in the Knowledge Sequence

Knowledge originated through an intra-cluster homogeneous sequence of rule firings as commonsense knowledge and to knowledge originated through an inter-cluster heterogeneous sequence of rule firings is commonly referred to as "creativity". The relative coherency of a processor cluster is defined by its number of distinct rule antecedents plus its number of distinct rule consequents, where this result is divided by twice the number of rules in the cluster. The relative coherency lies in the range (0, 1.0), where approaching zero from the right represents coherency and unity represents perfect incoherency. Thus, a processor cluster consisting of a single rule is incoherent by definition. An extensible set of processor clusters can automatically co-evolve to contain domain-specific problem-solving knowledge as follows:

a. Every new rule is supplied over the network to each processor cluster for acquisition. All rule movement is local to the containing processor cluster because this changes the rule ordering, which in turn may alter the results of transformation, what gets garbage collected, and ultimately what fires or can be fired when. Each processor cluster thus co-evolves to become a domain-specific problem solver. It is noted that processor clusters are readily and indefinitely extensible.

b. Each context is supplied over the network to each processor cluster, which will attempt to act on it in parallel and may or may not fire.

c. All or none of the processor clusters may respond (e.g., upon interrupt—triggered by the brain's reticular formation). Furthermore, each responder may supply a distinct answer. Responders are adjudicated in order of increasing response time; i.e., FIFO. This implies that over time, each processor cluster will evolve to produce a most-rapid correct response, which may still take a while. The specificity of the contextual matching process and the inter-cluster possibility of the rule selected for firing are not considered because as the processor clusters evolve to become domain-specific, they tend to fire exclusively and most rapidly on contexts, which cover their own domain. Besides, given two equally-specific solutions, the first responder is more likely to be valid because relatively fewer creative transformation rules would have been applied to the context.

d. This process for knowledge stimulation is termed pumping due to the analogous process for bringing atoms to a higher energy level in lasers. Here, pumping serves to directly amplify the virtual knowledge space of all acquiring processors and thus indirectly amplify the same in all networked processors. It follows from the theory of randomization (S. H. Rubin, "On Randomization and Discovery," *Information Sciences*, vol. 177, issue 1, January 2007, pp. 170-191) that as the number of so-defined processor clusters grows linearly the capability for knowledge amplification grows by some dynamic supra-linear function, until a point is reached with scale, where the capability for knowledge amplification becomes unbounded. Of course, given the necessarily finite inter-processor communication speeds in practice (i.e., limited by the speed of light in a vacuum), every capability for knowledge amplification will be time dependent.

Logical Transformations Example—Refrigeration Design

The following is given as a non-limiting example of a series of logical transformations which are performed according to the subject technique. The transformations demonstrate the utility of randomization in learning abstract design principles from granularizations of refrigeration systems and applying those principles to assist in the design of a thermoelectric refrigeration unit from a Carnot-cycle based one. The refrigeration example was chosen here for the sake of clarity; although, it should be clear that the type 2 KASER method is not limited to the field of refrigeration.

Figure 3:
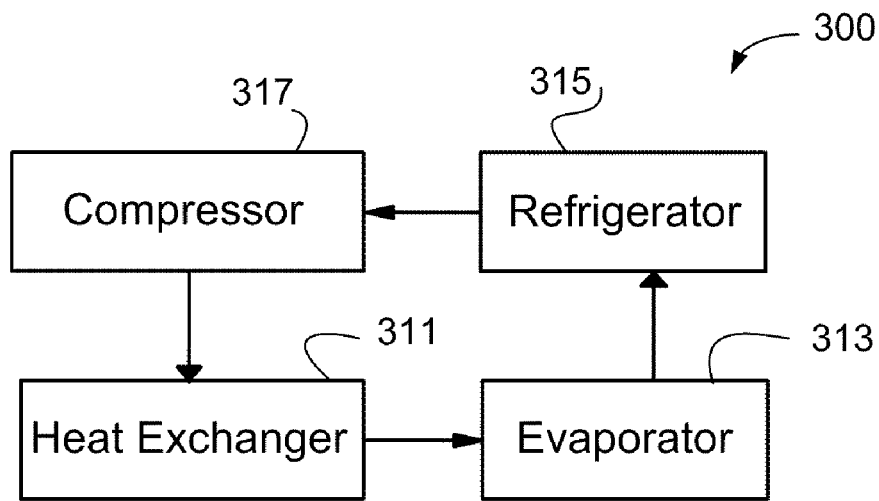
FIG. 3 is a schematic block diagram showing a design of a simple Carnot cycle refrigeration system.

FIG. 3 is a schematic block diagram showing a design of a simple Carnot cycle refrigeration system 300. Depicted are a condenser 311, an evaporator 313, a refrigerator (space to be cooled) 315 and a compressor 317. Basically, fluid is pumped by compressor 317 into condenser 311, past an expansion valve (not shown) to evaporator 313, from which the fluid returns to compressor 317. The heat transfer, from the refrigerator 315 to the evaporator 313, takes place when the fluid changes from gas to liquid, giving off heat in the condenser 311, and, after passing the expansion valve, changes from liquid to gas in the evaporator 313, thus absorbing heat.

Figure 4:
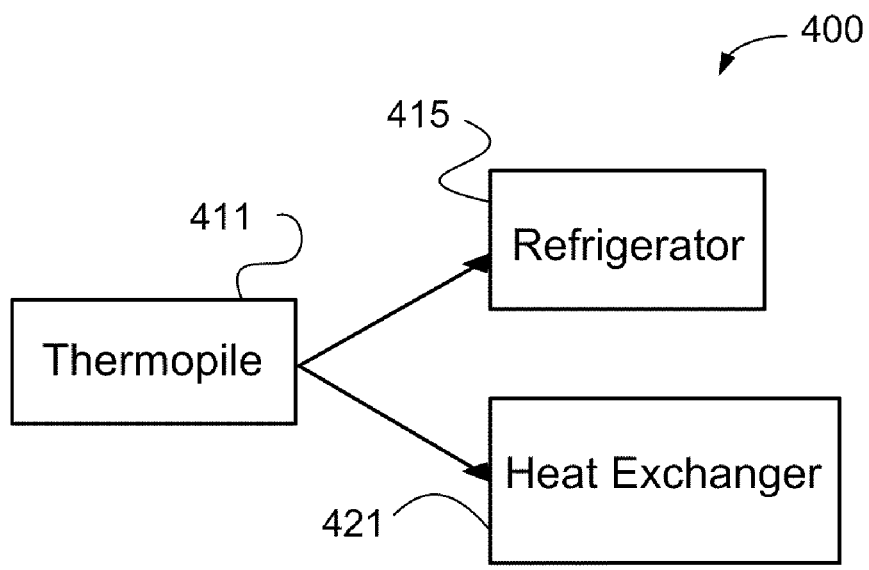
FIG. 4 is a schematic block diagram showing a design of a two-stage Carnot cycle refrigeration system.

This design has the simple predicate representation:
A
Next (condenser, heat exchanger 311);
Next (heat exchanger, evaporator 313);
Next (refrigerator 315);
Next (refrigerator, compressor 317);

FIG. 4 is a schematic block diagram showing a design of a two-stage Carnot cycle refrigeration system 400. Depicted are a thermopile 411, a refrigerator (space to be cooled) 415 and a heat exchanger 421.

This design has the simple predicate representation:
C
Next (thermopile 411, refrigerator 415);
Next (thermopile 411, heat exchanger 421);

Here, the problem is to create a non-deterministic space of possible maps from A to C as a prelude to the automatic design of a multi-stage thermoelectric refrigerator. The idea is to automatically port knowledge from one related design to another. The transformative rules in the rules space will be automatically constrained by other cases in system memory, which may not be contradicted. In this manner, the system will automatically get smarter as it acquires more knowledge. At this point, here are two viable maps in the transformative space, where the second is a generalization of the first:

| A | C |
|---|---|
| Next (condenser, heat exchanger); | next (thermopile 411, refrigerator 415); |
| Next (heat exchanger, evaporator); | next (thermopile 411, heat exchanger 421); |
| Next (refrigerator); | |
| Next (refrigerator, compressor); | |

Hence:

| A | C |
|---|---|
| Compressor | →Thermopile |
| Evaporator | →NIL |
| Next (X, NIL) | →NIL |
| Next (NIL, Y) | →NIL |

Equal (refrigerator, thermopile) (thermopile, refrigerator)

Now, consider applying this generalization to the design of a multi-stage thermoelectric refrigeration system. That is, A→C B′:

| A | C | B |
|---|---|---|
| Next (compressor, heat exchanger) | Next (thermopile, heat exchanger) | |
| Next (heat exchanger, evaporator) | | Next (heat exchanger, heat exchanger) |
| Next (evaporator, refrigerator) | → | NIL |
| Next (refrigerator, compressor) | Next (refrigerator, thermopile) | Next (freezer, thermopile) |
| Equal (refrigerator, freezer) | | |

Figure 5:
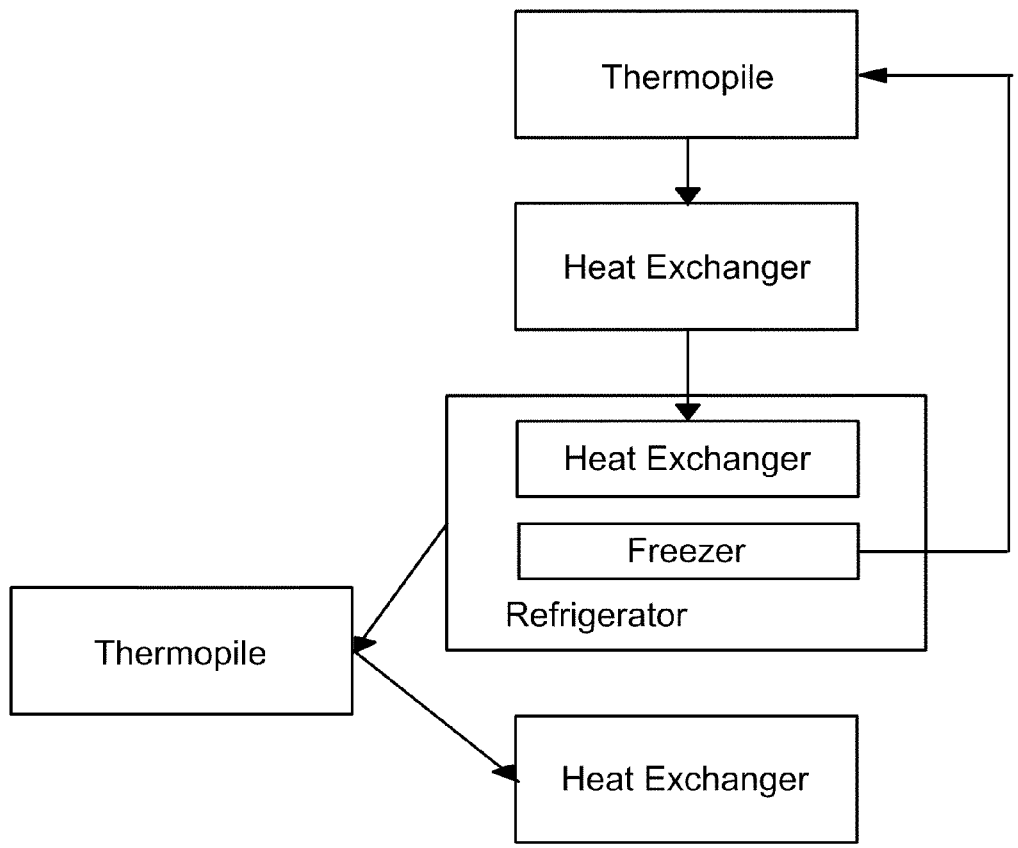
FIG. 5 is a schematic block diagram showing an untransformed result of a two-stage thermoelectric freezer.
Figure 6:
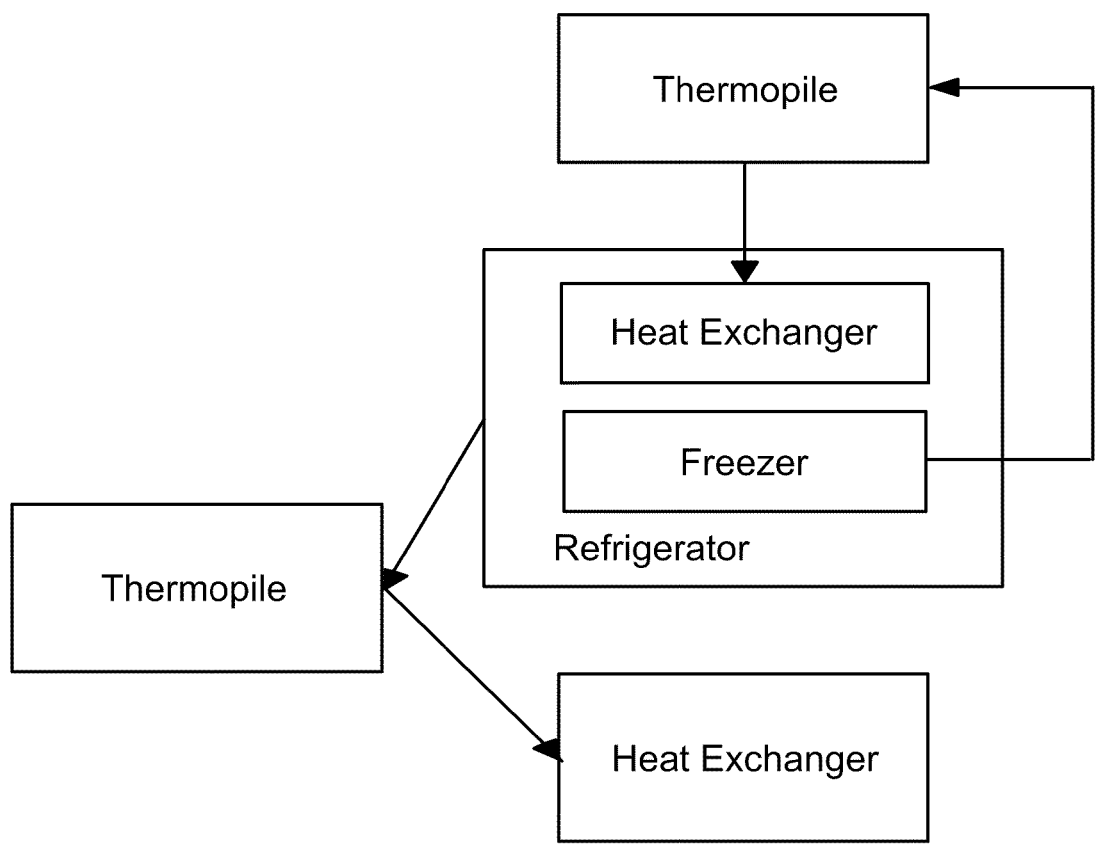
FIG. 6 is a schematic block diagram showing an initial transformation of the two stage thermoelectric freezer of FIG. 5.

The initial equivalent depiction of this two-stage thermoelectric freezer follows. The untransformed result is as depicted in FIG. 5. An initial transformation of the two stage thermoelectric freezer is as depicted in FIG. 6. In FIG. 6 one of the heat exchangers is eliminated and replaced with a thermopile. This provides a first transformation result as a two-stage thermoelectric freezer.

This design is not quite correct though due to a random variation. That is, the translation from fluid mechanics to thermo-electrics is not perfectly symmetric. It is observed that while it makes sense to cool a compressed gas in stages to conserve energy, this is not practical to do using thermocouples. Thus, a domain-specific (context-sensitive) transformation rule should be added. The domain-specific transformation rule is discovered automatically by the KASER algorithm:
{Next (thermopile, heat exchanger), Next (heat exchanger, heat exchanger)}→{Next (thermopile, heat exchanger)};

The corresponding flowchart follows FIG. 5. It is noted that this rule captures this essential difference in thermoelectric systems design for broadly applicable reuse, as well as for further specialization. It is also noted that this rule would not fire for the case of compressors. If the thermoelectric refrigerator were designed first and it was now desired to transform the solution to a gas refrigerator, then we would have the rule:
{Next (thermopile, heat exchanger)}→{Next (compressor, heat exchanger), Next (heat exchanger, evaporator), Next (evaporator, refrigerator)}, where
{Next (heat exchanger, evaporator)}→{Next (heat exchanger, evaporator), Next (heat exchanger, heat exchanger)}.

It is observed that right recursion will not be a problem. Looking closely at FIG. 6, there appears a design flaw; namely, a thermopile and its heat exchanger must be maintained at the same ambient temperature. FIG. 6 evidences that this is not the case for the second-level thermopile. Given that the graphics package here may not embody such domain-specific knowledge, the predicates should be added, namely, Same_Temp (Thermopile, Heat Exchanger), Colder (Refrigerator, Ambient), and possibly Colder (Freezer, Refrigerator). A first or second-order predicate calculus can be employed here to deduce relations. For example, a thermopile may not be found to be at ambient temperature with its heat exchanger in the freezer because it is possible to deduce Colder (freezer, ambient), which violates Same_Temp (thermopile, heat exchanger).

Figure 7:
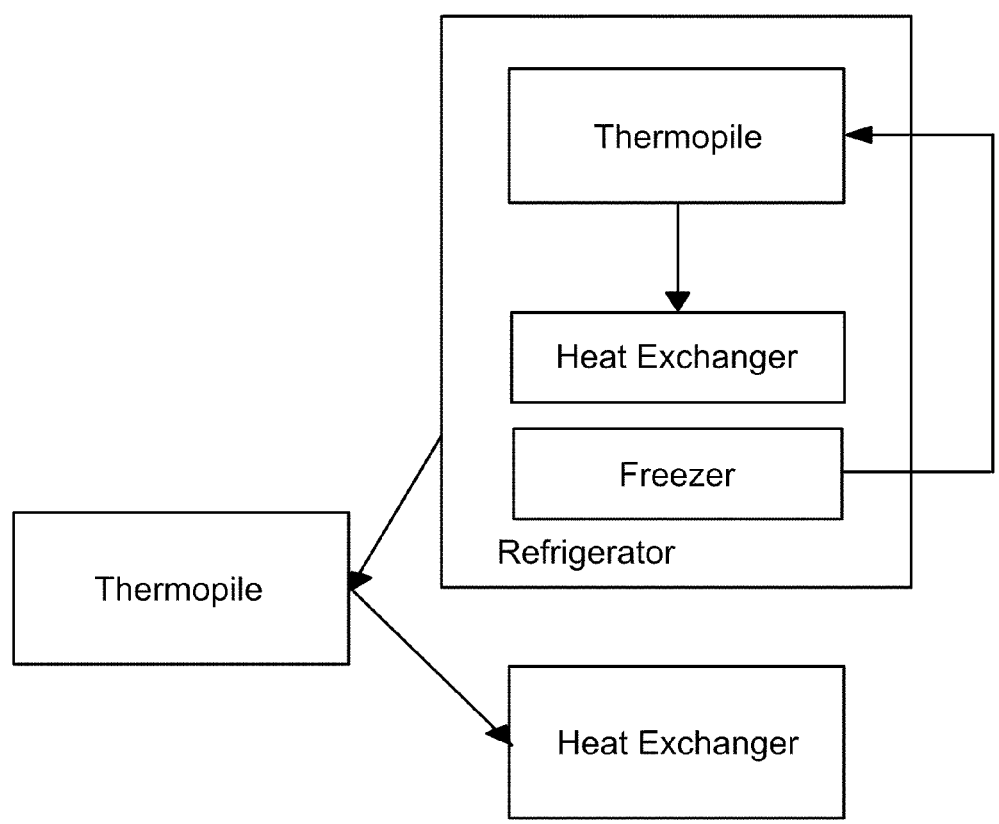
FIG. 7 depicts the second transformation result for a two-stage thermoelectric freezer; in other words, the working two-stage thermoelectric freezer model.

FIG. 7 depicts the second transformation result for a two-stage thermoelectric freezer; in other words, the working two-stage thermoelectric freezer model.

This simple example does not include (or preclude) the use of informative connectives (e.g., a dotted line indicating that the heat exchanger and freezer must not be too close to each other, and the like). Just like the directed arrow translates into the "Next" predicate, the labeled line segment here might be translated into the "Distant" predicate. Furthermore, each non-primitive box is hierarchically defined. Of course, decision boxes and similar constructs (e.g., to capture concurrency as in, Concurrent (Apply Front Brakes, Apply Rear Brakes)) may augment our block diagrams for use in more complex designs. Also, facilities may eventually be needed to support development by simultaneous users. Moreover, so far all generalizations have been made in the first-order predicate calculus through the simulated application of the KASER language translation algorithm. Finally, fuzziness in system design is captured by an allowance for nondeterministic (probabilistic) rewrite rules. For example, the predicate relation, Equal (refrigerator, freezer) can induce non-determinism into the design process.

While this methodology details transformational learning, the rules themselves can effectively program any conceivable learning methodology—including the presentation of questions to elicit additional context. The methodology provides for the fusion of different representations of knowledge. Taken in combination, an effective intelligence is realizable.

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method for reaching conclusions in the form of a series of rules in an array structure having a hierarchical order of validity, the method comprising:
   receiving a set of inserted rules as an initial rules array and storing the initial rules in at least one memory store on a computer;
   configuring the rules, where an antecedent comprises a non-empty, sorted set and a consequent comprises a non-empty sequence;
   determining a hierarchy of validity for the rules, and sorting the rules according to said hierarchy of validity;
   determining at least one rule set which optimizes the selection of rules, said rule set meeting predetermined validity requirements; and
   ordering the rules in order of validity based on rank within the memory store.

2. The method of claim 1, further comprising:
   using the rules ordered in order of validity to provide an output in a configuration in either a display of at least one of the rule sets or a transformation of an input to an output in accordance with one of the rule sets.

3. The method of claim 2, further comprising:
   configuring the rules in a form $\{i, j, k, \ldots\} \rightarrow (u\ v\ w)$, where the antecedent comprises a non-empty, sorted set of distinct positive integers and the consequent comprises a non-empty sequence of positive integers; and
   ordering the rules in order of validity based on a maximal length antecedent set as a highest rank.

4. The method of claim 3, wherein the step of determining a hierarchy of validity for the rules provides creative transformation rules; and wherein the step of determining at least one rule set provides optimization rules.

5. The method of claim 3, further comprising:
   determining a firing sequence of execution of the rules according to the hierarchy;
   receiving an input of a user evaluation of a correct implementation of the firing sequence;
   in the case of a user determination of a firing sequence, rendering a rule not decidable, receiving a user correction and inserting the correction to an array head;
   acquiring at least one new rule by evaluating existing rules or by inputting a new rule;
   in the case of a newly acquired rule exhibiting a higher degree of validity than a pre-existing rule having the same context, moving the rule with the higher degree of validity to an array head and moving the rule with the lesser degree of validity to an array tail; and
   in the case of the array reaching a predetermined full set, discarding the rule having a lesser validity.

6. The method of claim 3, further comprising:
   determining a firing sequence of execution of the rules according to the hierarchy according to potential for errors, with the highest ranking in the sequence representing the least potential for errors according to the ordering of the rules in order of validity; and
   converting a "0" percent potential for validity to a predetermined minimum validity.

7. The method of claim 2, further comprising:
   establishing a plurality of nodes subject to symmetric expansion within constraints defined by the nodes, whereby each node provides a domain-specific analogy;
   providing an approximation by using the domain-specific analogies, wherein each domain has a plurality of satellite nodes iteratively and recursively establishing domain-specific problem solutions, and wherein a specific domain subdivides into sub-specialty domains; and
   using a transformative interaction among nodes to categorize specialized knowledge within nodes,
   wherein at least one set of nodes provides a recursive function to a higher ranked set of nodes.

8. The method of claim 1, further comprising using an extensible set of processor clusters to automatically co-evolve to contain domain-specific problem-solving knowledge, wherein the problem-solving comprises:
   supplying new rules over a network to each processor cluster for acquisition;
   supplying contexts over the network to each processor cluster, thereby permitting the processor clusters to act on the contexts in parallel in cases permitting parallel processing; and
   permitting the processor clusters to selectively respond contingent on one or more predetermined conditions.

9. The method of claim 1, further comprising:
   using the transform of the two rules to create metaphorical explanations;
   translating the metaphorical explanations to a user interface language and providing the rules for user inspection;
   receiving a user input for selection of one or more rules;
   applying a most-specific most-valid rule subsequent to each creative transformation of an input to an output in accordance with one of the rule sets, thereby selecting a local creative transformation rule; and
   optimizing a consequent to completion, thereby selecting a local optimization rule.

10. The method of claim 1, further comprising:
    using networked processor clusters, and processing coherent or domain-specific knowledge in the respective clusters, thereby concentrating related knowledge in ones of the clusters to allow the individual clusters to share a maximal number of common antecedents and consequents.

11. A method for rendering a decision by use of a series of correlations, the method comprising:
    receiving on a digital electronic computer, a request to issue rules, the request including information in a semantic format;

providing at least one proposed rule for insertion into a set of rules;

determining a semantic relationship between the proposed rule and other rules in the set of rules;

determining a placement of the proposed rules in the set of rules in accordance with the semantic relationship and, in the case of two rules having a relatively close semantic relationship, the rule having the most specific creative transform of the two rules having a relatively close semantic relationship receives a hierarchical placement at a head and the rule having the least specific creative transform of the two rules having a relatively close semantic relationship receives a hierarchical placement at a tail;

in the case of the set of rules reaching a predetermined overflow limit, removing rules from the hierarchy according to predetermined criteria;

responding to the request to issue rules by applying the rules in the hierarchy in accordance with semantics in the information in the request to find and apply a most specific creative transformation to a rule context;

responding to the request to issue rules by applying the rules in the hierarchy in accordance with semantics in the information in the request to find and apply a most specific optimization to a rule consequent;

determining if the application of the rules resulted in a transformation; and displaying an output of one of the rule or the result of the application of the rule.

12. The method of claim 11, further comprising:

establishing a plurality of nodes subject to symmetric expansion within constraints defined by the nodes, whereby each node provides a domain-specific analogy;

providing an approximation by using the domain-specific analogies, wherein each domain has a plurality of satellite nodes iteratively and recursively establishing domain-specific problem solutions, and wherein a specific domain subdivides into sub-specialty domains; and using a transformative interaction among nodes to categorize specialized knowledge within nodes, wherein at least one set of nodes provides a recursive function to a higher ranked set of nodes.

13. The method of claim 11, further comprising:

using the transform of the two rules to create metaphorical explanations;

translating the metaphorical explanations to a user interface language and providing the rules for user inspection;

receiving a user input for selection of one or more rules;

applying a most-specific most-valid rule subsequent to each creative transformation of the context, thereby selecting a local creative transformation rule; and optimizing a consequent to completion, thereby selecting a local optimization rule.

14. The method of claim 11, further comprising:

using networked processor clusters to process coherent or domain-specific knowledge in the respective clusters, thereby concentrating related knowledge in ones of the clusters to allow the individual clusters to share a maximal number of common antecedents and consequents.

15. The method of claim 11, further comprising:

selecting from a subset of candidate rules in the hierarchy; and in the case of a longer covered antecedent set, saving the rules in the hierarchy in the hierarchy, wherein a first-found highest and longest covered antecedent associates with a most valid, most-specific rule.

16. A computer program product, comprising:

a computer-readable medium comprising:

a first instruction for causing a computer to receive a set of inserted rules as an initial rules array;

a second instruction for causing the computer to configure the rules, where an antecedent comprises a non-empty, sorted set and a consequent comprises a non-empty sequence;

a third instruction for causing the computer to determine a hierarchy of validity for the rules, and sorting the rules according to said hierarchy of validity;

a fourth instruction for causing the computer to determine at least one rule set which optimizes the selection of rules, said rule set meeting predetermined validity requirements; and a fifth instruction for causing the computer to order the rules in order of validity based on rank.

17. The computer program product of claim 16 wherein the computer-readable medium further comprises:

a sixth instruction for causing the computer to determine a firing sequence of execution of the rules according to the hierarchy;

a seventh instruction for causing the computer to receive an input of a user evaluation of a correct implementation of the firing sequence;

an eighth instruction for causing the computer to receive a user correction and to insert the correction to an array head;

a ninth instruction for causing the computer to acquire at least one new rule by evaluating existing rules or by inputting a new rule;

a tenth instruction for causing the computer to move the rule with the higher degree of validity to an array head and to move the rule with the lesser degree of validity to an array tail when a newly acquired rule exhibits a higher degree of validity than a pre-existing rule having the same context; and an eleventh instruction for causing the computer to discard the rule having a lesser validity when the array reaches a predetermined full set.

* * * * *